March 3, 1953 W. P. GEE 2,630,378
GENERATION OF SYNTHESIS GAS
Filed July 23, 1949
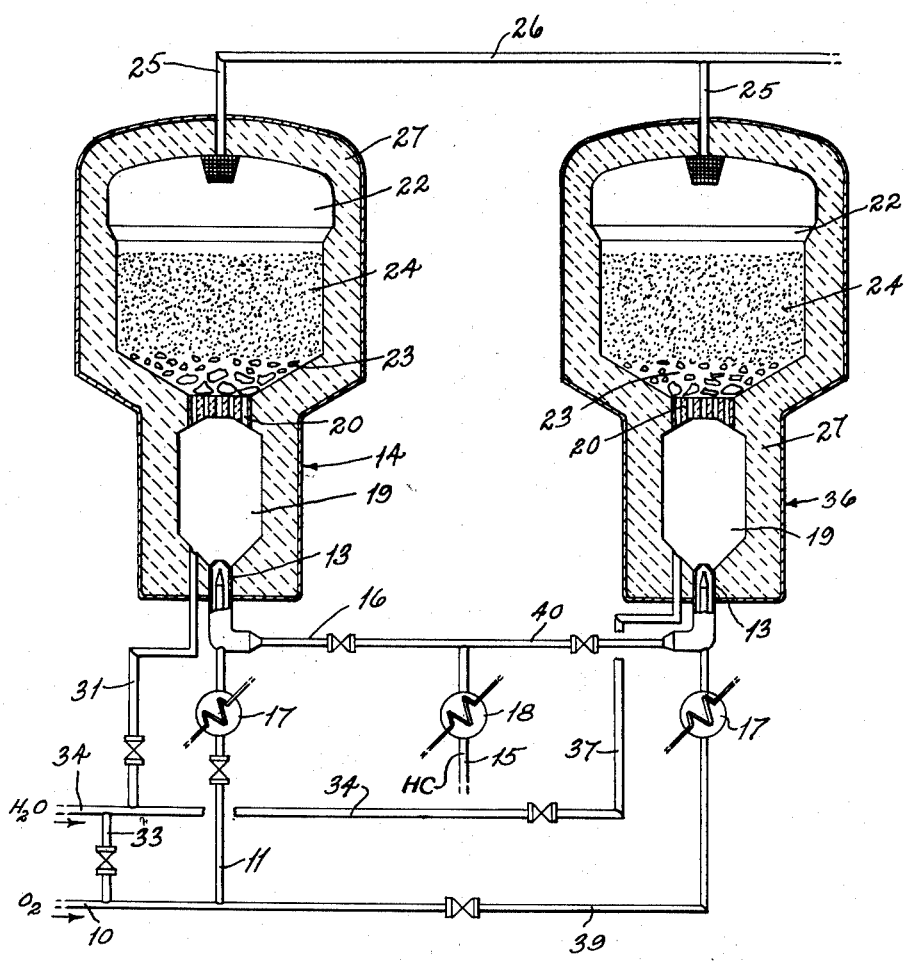
INVENTOR.
WILLIAM P. GEE
BY Daniel Stryker
J. H. Graham
ATTORNEYS

UNITED STATES PATENT OFFICE 2,630,378

GENERATION OF SYNTHESIS GAS

William P. Gee, Plainfield, N. J., assignor to Texaco Development Corporation, New York, N. Y., a corporation of Delaware Application July 23, 1949, Serial No. 106,367

6 Claims. (Cl. 48—206)

The present invention relates to the production of synthesis gas, that is, a product consisting essentially of hydrogen and carbon monoxide by the oxidation of hydrocarbons having an initial boiling point above 400° F., preferably above 500° F., and referred to herein as "high boiling hydrocarbons.'"

More specifically, it contemplates conversion of hydrocarbons of relatively low hydrogen content into a synthesis gas product containing a proportion of hydrogen substantially greater than that stoichiometrically indicated, under thermally autogenous reaction conditions, that is, in the absence of heat flow into the reaction zone.

In accordance with the present invention, a high boiling point hydrocarbon, as above, having an initial boiling point above about 400° F., as for example, a reduced crude or residual fuel oil, is first consumed by partial combustion with high purity molecular oxygen mixed therewith in a regulated, limited proportion such that the resulting combustion temperature does not fall below about 1600° F., and advantageously remains continuously in the range of about 2000–2400° F. The stream of oxygen necessary to attain such temperatures is substantially less than the stoichiometric equivalent for converting the hydrocarbon quantitatively into hydrogen and carbon monoxide, and inherently results in essentially complete conversion of the hydrocarbon into hydrogen, carbon monoxide and substantial quantities of solid carbonaceous material. In other words, due to the relatively high heat of combustion of these high boiling hydrocarbons in comparison with gaseous and lower boiling liquid hydrocarbons, higher combustion temperatures are encountered unless oxygen feed rate is substantially restricted.

Preheating of both the hydrocarbon and pure oxygen feed streams is advantageously employed to enable yet further limitation of the pure oxygen feed, and accordingly, the production of additional quantities of solid carbon.

As a result of effecting substantial conversion of the hydrocarbon into solid carbon, the remainder is converted to a synthesis gas which, as indicated above, necessarily has a higher than normal molar ratio of $H_2/CO$.

This gaseous product is separated from the resulting solid carbonaceous material, which is thereafter, in a second stage treatment, caused to react exothermically at an equivalent elevated temperature level, with a mixture of steam and an additional amount of high purity oxygen in regulated quantities sufficient to meet the thermal requirements of the reaction and effect consumption of the solid carbon with the formation of an additional stream of hydrogen and carbon monoxide. As intimated, temperature in the second, or carbon consumption stage, is autogenously held in the preferred range of 2000–2400° F., and is in no event permitted to fall without the broad range of 1600–2600° F.

The resulting gaseous product, admixed with the first stage gases, forms a synthesis gas having a much more favorable $H_2/CO$ ratio than that resulting from direct partial combustion because of the formation of additional hydrogen by the decomposition of the steam, thus obviating to a large extent the water-gas shifting and associated gas separation treatments hitherto necessary to effect a hydrogen enrichment sufficient for the synthetic production of hydrocarbons.

The invention has the further advantage of overcoming the hazards of excessive temperature generation associated with the combustion of high boiling hydrocarbons with high purity molecular oxygen in an amount sufficient to oxidize substantially all of the feed carbon.

More specifically, limitation of the molecular oxygen feed in the initial, or hydrocarbon combustion stage, as above indicated, positively limits the attainable temperature to a practically safe range. Therefore, it is possible to carry out the process safely, even at substantial superatmospheric pressure, within a reaction zone having walls of commercially available refractory material. Moreover, the residual solid carbonaceous product of the initial hydrocarbon combustion stage is made available in the second stage reaction zone at reaction temperature, requiring only a limited supplemental feed of pure oxygen in the second stage to effect the endothermic reaction of substantial quantities of steam.

In particular, the present invention contemplates the oxidation of the feed hydrocarbon with a total amount of oxygen, both free and combined, i. e., in the form of steam and water vapor, not substantially in excess of the atomic quantity of carbon in the hydrocarbon feed material. More specifically, it contemplates an overall atomic O/C ratio of the total reactants of about 1.05, and its broadest aspect is within the range of about 1.05 to 1.25.

Of the total oxygen, both free and combined, reacted in both stages, about 60–80% is high purity oxygen in the free or molecular form, and about 20-40% is in the form of water vapor. Since the consumption of each mol of water vapor in the system results in the liberation of one mol of molecular hydrogen, the overall synthesis gas yield is supplemented by a substantial quantity of hydrogen approximating the molecular quantity of water vapor reacted. Thus, in the case of a typical gas oil in which the atomic ratio of hydrogen to carbon approximates about 2:1, a system operated as above with a total O/C ratio of about 1.05:1 results in realization of close to the theoretical 20-40% increase in the $H_2/CO$ ratio of the total synthesis gas product, above indicated, as accountable to the decomposition of the added steam by reaction with the hot, solid carbon.

As above indicated, molecular oxygen supplied to the process is so distributed between the two stages as to maintain, in both stages, a temperature preferably in the range of 2000-2400° F., within which maximum practical yield of desired hydrogen and carbon monoxide is realized. Therefore, in practice, the actual atomic O/C ratio in which free oxygen and hydrocarbon are admixed and consumed in the first stage combustion step is normally in the range of about 0.30 to about 0.85; the remainder of the free oxygen is consumed in the second stage in admixture with the steam.

In summary, therefore, the distribution of feed oxygen to the several stages, basis atomic ratio to total hydrocarbon consumed, in practice usually falls within the following ranges:

| High purity molecular $O_2$: | O/C |
|---|---|
| 1st stage | 0.35-0.85 |
| 2nd stage | 0.30-0.10 |
| Total $O_2$ | 0.65-0.95 |
| Oxygen from steam | 0.20-0.40 |
| Total free and combined oxygen | 1.05-1.35 |

Actually, however, temperature conditions are influenced to a substantial extent by extent of reactant preheat, carbon content of the feed hydrocarbon and relative heat loss from the reactor employed, and since temperature is a critical criterion of proper operation, true regulation of free oxygen and steam feeds is most appropriately determined by trial and adjustment to a controlled feed rate such that the reaction proceeds continuously at the critical temperature level. In addition, steam consumption in the second stage is maintained at as high a level as possible, and the free oxygen consumption held as low as possible consistent with continual maintenance of the desired reaction temperature.

The present invention lends itself to embodiment in a number of practical forms. For example, it is feasible to carry out the individual stages of reaction stepwise in a single reaction zone, preferably packed or occupied at least partially with a loose particulate packing or checkerwork of inert refractory material which may serve to accumulate and retain the deposit and to accumulate also the sensible heat energy liberated by the combustion of the high boiling hydrocarbon so that oxidation of the solid carbonaceous material is thermally facilitated. Alternatively, however, it has been found advantageous to effect first stage combustion in an open and unpacked generation chamber, discharging into a second reaction zone in which the solid carbon is collected and thereafter subjected to second stage reaction. This has the advantage of maximizing production of desired gases and yielding solid carbon in a much more finely divided form particularly adapted to efficient subsequent reaction with steam.

One such system is illustrated more or less diagrammatically in the attached drawing presented for the purpose of more specifically illustrating one preferred manner of practicing the present invention.

Therein a stream of high purity molecular oxygen, namely, above 85% and preferably above 95% purity is introduced from a source not shown through pipe 10 and branch pipe 11 into a mixing burner nozzle 13 in the bottom of reactor 14. Simultaneously a high boiling point hydrocarbon oil is supplied to the burner nozzle 13 from any suitable source not shown through inlet pipe 15 and branch pipe 16. Provision is made for preheating the separate streams to a temperature of, for example, 200-800° F. by exchangers or preheaters 17 and 18, which may derive thermal energy from the hot final products of reaction.

The mixture of feed hydrocarbon and pure oxygen, regulated to an atomic O/C ratio in the range of about 0.30 to 0.65 at which the reaction temperature continuously remains in the critical range of preferably 2000-2400° F., discharges into combustion chamber 19 where it burns to form product consisting essentially of hydrogen and carbon monoxide containing fine, entrained or suspended carbon particles.

The resulting product suspension, substantially at reaction temperature, passes upwardly through an apertured arch 20 into an upper chamber 22. The bottom of the chamber 22 just above the arch 20 is occupied by layers of broken refractory 23 of successively decreasing particle size, ultimately supporting a substantial body of powdered refractory 24, e. g., sand, carborundum, magnesia or the like.

The powdered refractory may take the form of either a settled phase or else a dense fluid phase supported by the upflow of gases therethrough. In either event, the carbon particles are entrapped by the inert particles of refractory, and thus filtered out of the gaseous product stream. The essentially particle-free gas separates at the upper level of the filter bed and is removed through outlet pipe 25 into header 26.

The broken layers of refractory 23 accordingly act as a distributing means to supply the gases to the bottom of the bed of powdered refractory 24, without permitting gravitation into the open, unpacked chamber 19.

As indicated, both the lower chamber 19 and upper chamber 22 are preferably provided with a substantial lining of refractory and insulating material 27, effective to conserve heat energy and promote efficient operation at the elevated temperature level contemplated.

Thus, for example, the relative proportion of oxygen and high boiling hydrocarbon supplied to the burner 13 is adjusted as above indicated to maintain a constant temperature level of 2400° F. in chamber 19. As a result, the upper chamber 22 is brought to the same temperature. When the accumulation of solid carbon particles in the filter bed 24 reaches a substantial level, actuation of the burner 13 is terminated by closing the control valves shown in lines 11 and 16, and thereafter a mixture of high temperature steam and oxygen is introduced into chamber 19 through pipe 31, flowing upwardly through the perforated arch 20 and reacting, at a temperature of 2000-2400° F., with the finely divided carbon particles entrapped in the hot filter bed 24 to form a product gas consisting essentially of $H_2$ and CO.

The mixture of high temperature steam and oxygen in pipe 31 is derived by injecting a metered portion of the pure oxygen supply in pipe 10 through valved branch pipe 33 into steam supply pipe 34 which is supplied continuously with high temperature steam from any suitable source not shown.

As a result, the reaction chambers 19 and 22 operate on alternating cycles in the first of which the high boiling hydrocarbon burns with a limited quantity of oxygen under carbon-forming conditions to yield a synthesis gas of high $H_2$/CO ratio and deposit finely divided carbon in the chamber 22. In the second, or carbon cleanup cycle, the mixture of high temperature steam and oxygen consumes the carbon to form additional hydrogen and carbon monoxide with the decomposition and dissociation of water vapor and the supplementary formation of additional hydrogen.

Provision, in the form of an additional reactor 36 identical in construction and reference number detailing, is made for supplying a continuous mixture of product gas of approximately uniform composition. To this end, during the time that the burner 13 in reactor 14 is being supplied with hydrocarbon oil and oxygen to effect partial combustion in chamber 19, the burner feed of reactor 36 is shut down and the consumption of carbon in chamber 22 thereof is being effected by the introduction of the steam-oxygen mixture through pipe 34 and branch pipe 37. Likewise, as reactor 14 is switched to operation on the mixed stream of steam and oxygen introduced through pipe 31, the oxygen-steam flow to reactor 36 through branch pipe 37 is terminated and the introduction of oxygen and hydrocarbon oil to the burner is initiated through branch pipes 39 and 40. As a result, the product streams passing from outlet pipes 25 into header 26 maintain an approximately constant composition corresponding to the mixed product gases from the two reactors.

In accordance with one example of actual operation, an unpacked refractory-lined reaction chamber is fed through the nozzle of a mixing burner with about 22.28 pounds per hour of Santa Maria Valley Crude Residuum at a preheat of about 400° F., to which is separately supplied a stream of oxygen of approximately 100% purity at a preheat of about 600° F. and a feed rate of about 150 standard cubic feet per hour. The pressure in the reaction zone is about 250 p. s. i. g. and the temperature continuously approximates 2400° F., yielding a product comprising essentially hydrogen and carbon monoxide containing a voluminous suspension of finely divided solid carbonaceous particles.

The effluent stream is passed through a filter bed of finely divided sand contained in a refractory-walled, insulated chamber until the accumulation of carbon particles substantially increases the pressure drop. At this time, the feed of residuum and oxygen to the reaction chamber is terminated, and in lieu thereof a steam-oxygen mixture formed by intermixing steam at a temperature of 730° F. and pure oxygen at a preheat of 600° F. is passed upwardly through both the reaction chamber and the filter bed. The mixture consists of about 1.8 mols of steam per mol of oxygen, and comprises 6.86 pounds of steam and 80.9 standard cubic feet of oxygen per hour. The free oxygen is substantially consumed during its upward passage in contact with the finely divided solid particles of carbon. The gaseous products are withdrawn from the upper surface of the sand bed and mixed with the gases previously recovered, yielding a product on the dry basis having the following analysis:

|  | Mol per cent |
|---|---|
| $H_2$ | 45.76 |
| CO | 47.89 |
| $CO_2$ | 3.44 |
| $CH_4$ | 2.74 |
| $N_2$ | 0.17 |

All of the oxygen fed is consumed and 5.90 pounds of steam are reacted to produce additional hydrogen and carbon monoxide.

In contrast to the relative proportions of hydrogen and carbon monoxide realized in the final gaseous product, as shown by the above analysis, the Santa Maria Valley Crude Residuum has a hydrogen and carbon analysis corresponding approximately to the following ratio:

$$H:C = 1.5:1$$

which corresponds, per se, to a final synthesis gas of $H_2$/CO ratio of about 0.75:1. By way of comparison, the $H_2$/CO ratio in the product of the above example is equal to about 0.955, or an increase of about 27.4%, over that realizable by the direct combustion of the same feed with molecular oxygen. In addition, as indicated above, the process operates continuously free from the hazards which would be inherent in the introduction of any substantially greater proportion of pure oxygen with the combustible feed oil.

While the foregoing example is based upon treatment of a petroleum fraction of exceptional relative deficiency in hydrogen content relative to carbon, it should be understood that the invention is, however, applicable to hydrocarbons of somewhat increased hydrogen content, as for example, gas oils and cycle stocks in which the atomic $H_2$/CO ratio may be as high as 2:1 or frequently somewhat greater. The advantages, particularly in regard to the attainable $H_2$ supplementation of the final product gas, are especially striking in the case of the relatively more hydrogen-deficient feeds and it is therefore to be noted that the term "hydrocarbon" as used herein contemplates heavy residuals, asphalts, and even coals containing typical small proportions of combined hydrogen.

For example, the invention specifically contemplates the provision of coal liquefaction means, effective in known ways by means of heat, pressure, solution or any combination thereof, for supplying to burner 13 a combustible mixture containing the appropriate proportion of pure oxygen for effecting first stage combustion, as above indicated.

As above intimated, it is also contemplated providing a packing or checkerwork within the reaction zone 19 upon which the carbonaceous solids resulting from a combustion of the high boiling hydrocarbons will tend to adhere and thus eliminate the necessity for a separate filter bed. The solid carbon deposits are thereafter consumed during the subsequent exothermic treatment with the steam-oxygen mixture as above.

As previously indicated, the present invention is particularly advantageous in connection with operations conducted at substantial superatmospheric pressures. Thus, while the process is suitably effective at ordinary pressures, the above indicated advantages assume a more striking magnitude when the reaction zones are operated at pressures above 150 p. s. i. and up to 600 p. s. i. and higher. In particular, heat losses appear to be minimized under such conditions with resulting improved efficiency of operation and increase in the relative production of hydrogen. There are, of course, the additional advantages of economy in equipment size and obviation of the increased compression costs of bringing the relatively voluminous product stream to the pressures currently required in the subsequent conversion of synthesis gas into desired hydrocarbon products of reaction.

Obviously, many modifications and variations of the invention as hereinbefore set forth may be made without departing from the spirit and scope thereof, and therefore only such limitations should be imposed as are indicated in the appended claims.

I claim:

1. In the process for the generation of synthesis gas comprising essentially hydrogen and carbon monoxide from high boiling point liquid hydrocarbons relatively deficient in hydrogen, the improvement which comprises reacting said hydrocarbon at a temperature within the range of 1,600° F. to 2,600° F. with high purity free oxygen in a regulated amount substantially below that stoichiometrically necessary to convert said hydrocarbon completely into hydrogen and carbon monoxide thereby maintaining carbon-forming conditions such that the high boiling hydrocarbon is substantially completely converted into solid carbonaceous material together with gases comprising essentially hydrogen and carbon monoxide, separating the carbonaceous solids thus liberated, reacting said carbonaceous material in a separate succeeding step with a mixture of steam and high purity oxygen in relative proportion effective to maintain said reaction zone autogeneously at an elevated temperature such that said reaction proceeds with the production of additional hydrogen and carbon monoxide, and recovering the product hydrogen and carbon monoxide thus produced.

2. The method according to claim 1 wherein the said reactions are effected at a predetermined temperature in the range of 2000–2400° F.

3. The method according to claim 1 wherein the said carbon-forming conditions consist of the regulated combustion of said hydrocarbon oil and said substantially pure oxygen stream in relative proportions such that the total O/C ratio is in the range of 0.30:1 to 0.85:1, at which the reaction temperature is between about 2,000 to 2,400° F.

4. The method according to claim 1 wherein the proportion of substantially pure oxygen admixed with the steam and contacted with the liberated free solid carbonaceous material is such that the temperature of the reaction zone remains substantially in the range of 2,000 to 2,400° F.

5. In the process for the generation of synthesis gas comprising essentially hydrogen and carbon monoxide from high boiling point liquid hydrocarbons relatively deficient in hydrogen, the improvement which comprises reacting said hydrocarbon with high purity free oxygen in a regulated amount such that the reaction temperature is in the range of about 2,000–2,400° F., effecting substantially complete consumption of said reactants with the formation of product consisting essentially of hydrogen and carbon monoxide, together with substantial formation of solid carbon, separating said gaseous products from the solid carbon thus formed, reacting said solid carbon in a separate succeeding step with a mixture of steam and substantially pure oxygen in a relative proportion effective to maintain the reactants autogenously at an elevated temperature of about 2000–2400° F., thereby forming a gaseous product consisting essentially of hydrogen and carbon monoxide.

6. In the generation of a synthesis gas comprising essentially hydrogen and carbon monoxide from high boiling point liquid hydrocarbons relatively deficient in hydrogen, the improvement which comprises reacting said hydrocarbon with high purity free oxygen in a regulated amount such that the O/C ratio of the hydrocarbon-oxygen mixture is maintained at a value in the range of 0.30:1 to 0.85:1 at which the reaction temperature is in the range of 1600–2600° F., thereby establishing carbon-forming conditions under which the high boiling hydrocarbon is essentially completely converted into hydrogen, carbon monoxide and solid carbonaceous material, separating the carbonaceous solids thus liberated, reacting the carbonaceous solids in a separate succeeding step with a mixture of steam and high purity oxygen at a temperature in the range of 1600–2600° F., thereby effecting the consumption of said carbonaceous solids with the production of additional hydrogen and carbon monoxide, and regulating the overall relative feed of hydrocarbon, steam and free oxygen such that the total atomic O/C ratio of the reactants is in the range of about 1.05 to about 1.35.

WILLIAM P. GEE.

REFERENCES CITED

The following references are of record in the file of this patent:

UNITED STATES PATENTS

| Number | Name | Date |
| --- | --- | --- |
| 1,904,908 | Voorhees | Apr. 18, 1933 |
| 1,966,610 | Chilowsky | July 17, 1934 |
| 2,002,863 | Nagel | May 28, 1935 |
| 2,177,379 | Van Nuys | Oct. 24, 1939 |
| 2,482,187 | Johnson | Sept. 20, 1949 |
| 2,521,195 | Wheeler | Sept. 5, 1950 |